June 7, 1927.  1,631,357

R. F. BLAIR ET AL

DRIVER'S COMPARTMENT FOR VEHICLES

Filed Aug. 6, 1926  3 Sheets-Sheet 1

Inventors
Robert F. Blair
and George Hind

By

Attorneys

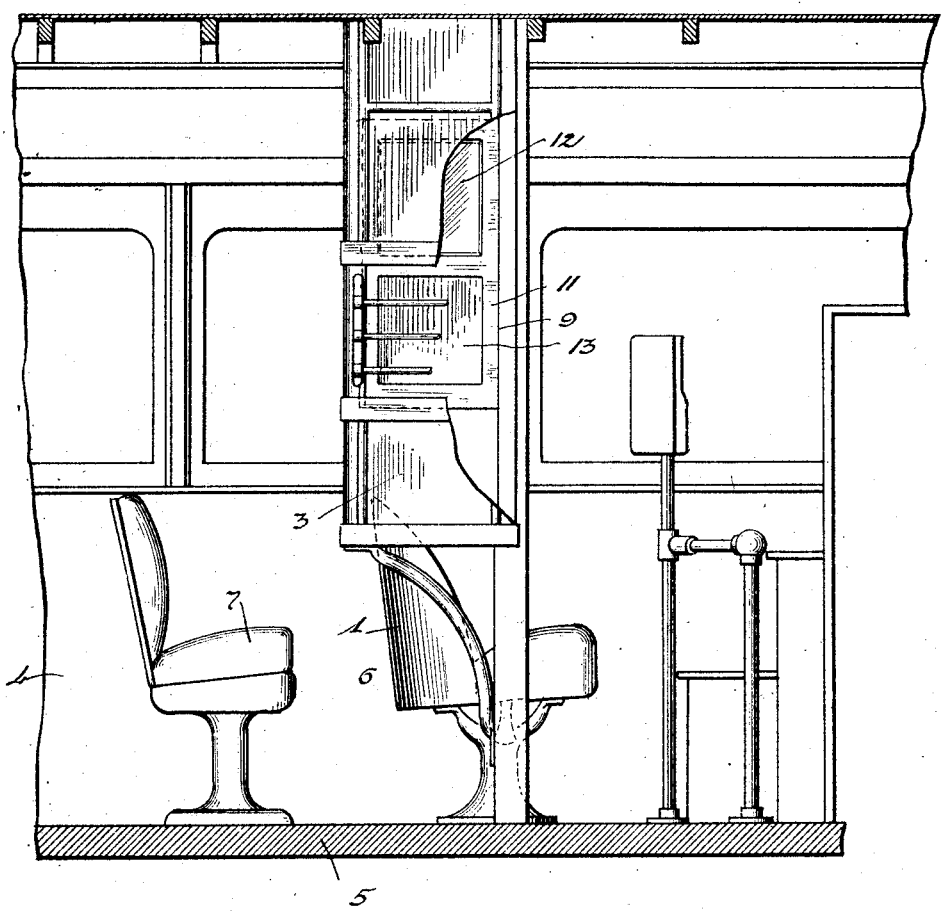

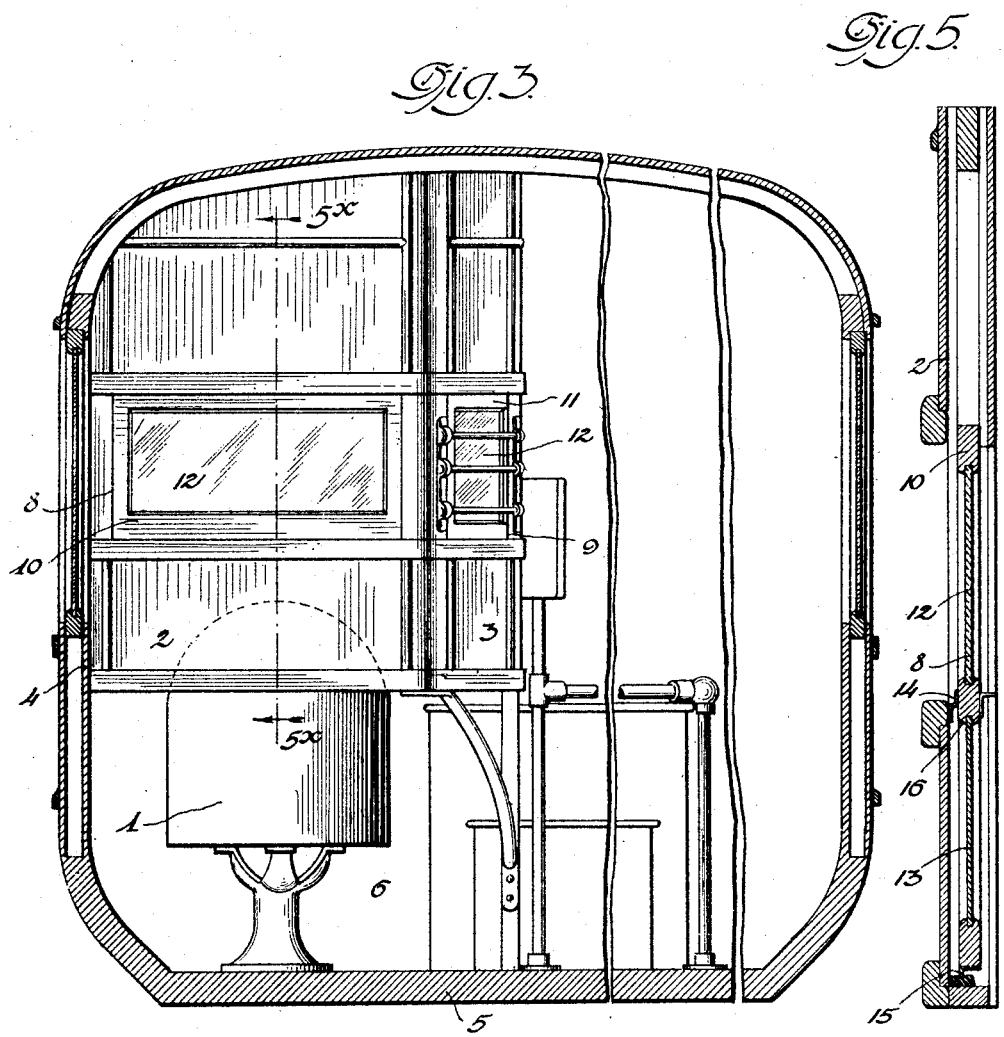

Patented June 7, 1927.

1,631,357

UNITED STATES PATENT OFFICE.

ROBERT F. BLAIR AND GEORGE HIND, OF DETROIT, MICHIGAN.

DRIVER'S COMPARTMENT FOR VEHICLES.

Application filed August 6, 1926. Serial No. 127,502.

This invention relates to the drivers' compartments of motor busses and similar vehicles, the object being to provide an enclosure for the driver which will effectively protect him against crowding by passengers; will admit of a maximum of ventilation for such enclosure and which is adapted to admit of the driver having a clear view at will, of the interior of the vehicle or of screening himself effectively from light within the interior of the vehicle when desired, such as when driving at night, and for purposes of visibility, it is advisable to so screen off the light from the driver's compartment.

A further object of the invention is to provide in the rear wall of a driver's compartment a sliding panel movement relative to an opening in the rear wall and having a transparent section and an opaque section, either of which may be moved into position with the opening, so that the driver may view the interior of the vehicle through the said transparent section, or may move the panel to a position in which the opaque section obscures such opening.

The invention also contemplates the provision of walls forming the driver's compartment in the form of partitions terminating at some distance from the floor of the vehicle in order to admit of free circulation of air therebeneath and also to admit of unobstructed foot room for passengers who may be seated immediately behind such partition, whereby the comfort of both the driver and such passengers is provided for.

Still further objects subsidiary to or resulting from the aforesaid objects, or from the construction or operation of the invention as it may be carried into effect, will become apparent as the said invention is hereinafter further disclosed.

In carrying the invention into effect, we may provide as an enclosure for the driver of a vehicle, a two-sided partition, the side forming the back of the enclosure extending inwardly from the side wall of the vehicle to beyond the driver's seat, and the other wall of the partition extending forwardly of the inner end of the first mentioned wall to within a short distance of the front of the vehicle, the lower part of these walls terminating at a substantial distance from the floor of the vehicle, and a suitable support in the form of a leg or post being provided for the said side wall. Where passenger seats are located to the rear of the enclosure, these may be comparatively close to the rear wall thereof, as the legs of the seated passengers may be extended beneath such enclosure as a result of its elevated nature.

The walls of the said enclosure are double and have sight openings therein intermediate of their height and within the walls are arranged vertically slidable panels, the upper halves or sections of which are glazed to form windows, and the lower halves or sections of which are solid or opaque, so that when the said panels are in their lowermost position the windows thereof are opposed to the openings in the walls of the partition, and when the said panels are raised the said openings are closed to the passage of light therethrough by the opaque parts of the panels. Suitable means are provided for the raising and lowering of the said panels and for the maintaining of the said panels in either their raised or lowered positions.

All of which is more particularly described and ascertained hereinafter, by way of example, having reference to the accompanying drawings, wherein—

Figure 2 is a fragmentary vertical longitudinal section of the front part of such vehicle showing the driver's enclosure, part of which is broken away to illustrate the internal arrangement thereof;

Figure 3 is a broken transverse section of such vehicle;

Figure 5 is a detail sectional view of the rear wall of the driver's enclosure, taken on the line 5×—5×, Figure 3.

Similar characters of reference indicate similar parts in the several figures of the drawings.

Figure 1:
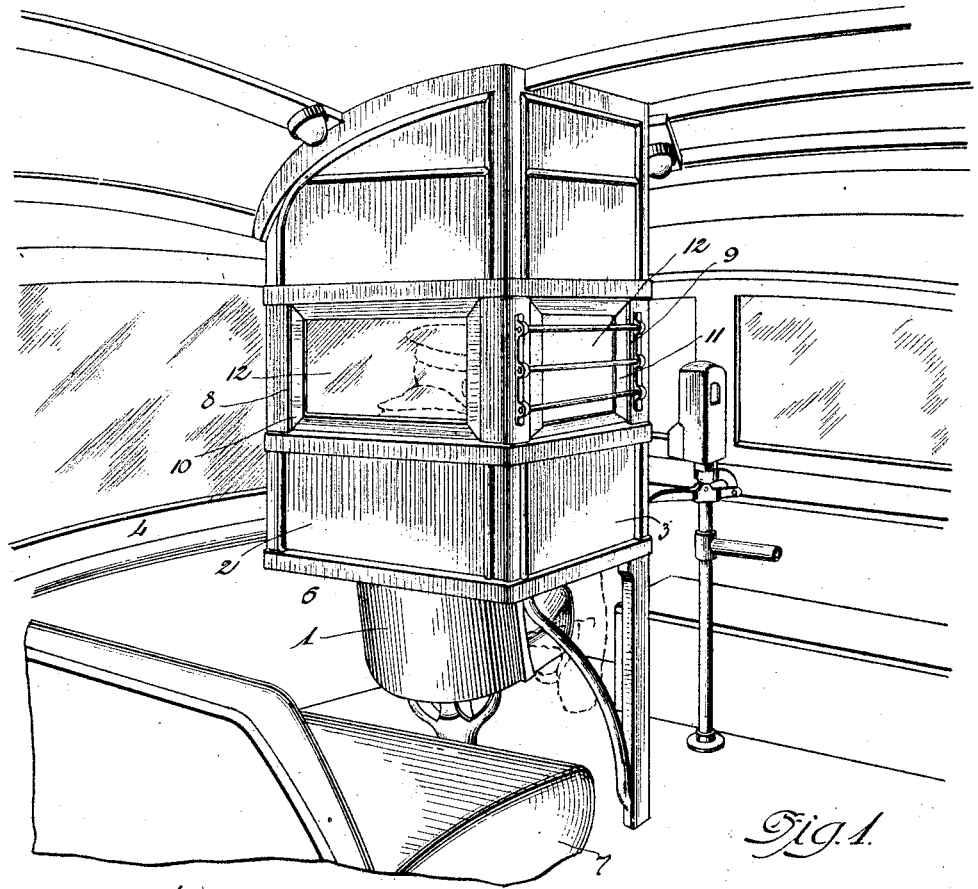
Figure 1 is a fragmentary perspective view of the interior of the front part of a motor bus equipped with an embodiment of the said invention.
Figure 4:
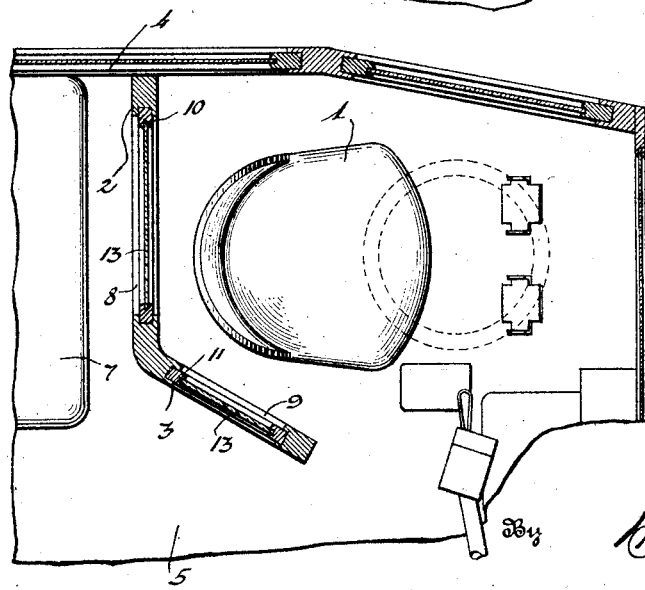
Figure 4 is a fragmentary sectional plan of the same.

1 is the driver's seat of a motor bus, which seat is usually located at the lefthand side of the front of the vehicle, and it has been a more or less common practice to provide a roller, blind or curtain immediately to the rear of the driver which he may pull down to shade off light which might otherwise obscure his vision through the windshield, especially at night, and also as a means of shutting himself off from the passengers in the vehicle so that his attention will not be detracted from his work. Such an arrangement is not very substantial or at all times reliable, and has not the stability and permanency which is desirable, and in the drawings we indicate a passage or enclosure comprising rear and side walls 2 and 3 arranged about the driver's seat, said rear wall extending inwardly of the vehicle from the side wall 4 of the body thereof, and the wall 3 forwardly of the vehicle from the inner end of the rear wall 2 and preferably at an angle thereto as indicated in Figure 4. The lower extremities of these walls terminate at some distance above the floor 5 of the vehicle, thereby providing a substantial space or opening 6 admitting of great freedom of air circulation between the driver's compartment and the interior of the vehicle, and also admitting of a passenger seat 7 being placed comparatively close to the enclosure, as the legs of passengers seated on the said seat 7 may be extended into the space 6 beneath the said partition.

The said partition is of hollow construction and has sight openings 8 and 9 therein intermediate of its height, and within the hollow walls of the partition are arranged sliding panels 10 and 11, each of the said panels being provided with an upper glazed section or window 12 and a lower opaque section or shutter 13.

At the lower margins of the openings 8 and 9 we may arrange jumper strips 14, the lower edges of the panels being each provided with a rib or extension 15 adapted to engage the said jumper strips when the panels are raised, each panel being provided with a suitable finger grip 16 to facilitate raising or lowering of the panels.

Thus it will be seen that the driver may lower the panels to place the glazed portions thereof into juxtaposition with the openings in the partition when he desires to have a clear vision of the interior of the vehicle from his seated position, but may raise the said panels such as for the purpose of excluding light from the rear part of the vehicle entering the driver's enclosure and causing reflections on the windshield in front of the driver which interfere with visibility through the said windshield.

It will be understood that the lower part of the panel may be used for advertising purposes quite easily, and provides a valuable space for such purposes which is not ordinarily available in the ordinary form of driver's enclosure. The permanency and neat appearance of the arrangement is self-evident as also is the positive and easy manner of its operation, and as the effective screening of the driver from the passengers of such a vehicle in a manner discouraging conversation with the driver and other interference is a factor of safety which is very desirable, the type of enclosure suggested still further recommends itself, as it will be observed that in either the raised or lowered position of the panel, the driver is equally well protected from interference by passengers in the vehicle.

This invention may be developed within the scope of the following claims without departing from the essential features of the said invention, and it is desired that the specification and drawings be read as merely illustrative and not in a limiting sense, except as necessitated by the prior art.

What we claim is:—

1. In a vehicle, a driver's enclosure comprising a partition including a wall situated rearward of the driver's seat, said wall having a sight opening intermediate of its height, a vertically slidable panel having a glazed portion and an opaque portion, either of which may be brought into juxta-position with said sight opening by the sliding of said panel, and means for retaining said panel in either position to which it may be moved.

2. In a vehicle, a driver's enclosure comprising a partition including a rear wall and a side wall, both having sight openings intermediate of their height, vertically slidable panels each having a glazed portion and an opaque portion one or other of which portions is adapted to be brought into juxta-position with the sight opening of the wall on which the particular panel slides to permit or obscure the passage of light through the sight opening and means for securing the panels in a raised or lowered position.

3. In a device of the class described, a partition having an opening intermediate of its height, said partition being hollow to provide compartments in said partition above and below said opening, a panel vertically slidable in said compartments and comprising upper and lower sections, one of which is glazed and the other opaque, means for sliding said panel into one or other of said compartments to bring the glazed or the opaque section of said panel into juxta-position with said opening, and means retaining said panel in either of such positions to which it may be moved.

4. An enclosure according to claim 1, the lower part of which terminates at a substantial distance from the floor of the vehicle, as and for the purpose as specified.

5. In a vehicle, a driver's enclosure comprising a partition dividing the driver's section from the passenger section of such vehicle, the base of said partition being situated at a substantial height from the floor of the vehicle to provide leg room for passengers seated therebehind and a free circulation of air beneath the said partition between the driver's section and the passenger section of the vehicle.

In testimony whereof we affix our signatures.

ROBERT F. BLAIR.
GEORGE HIND.